(12) United States Patent
Bai et al.

(10) Patent No.: US 12,407,069 B2
(45) Date of Patent: Sep. 2, 2025

(54) BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Lulu Bai, Ningde (CN); Xinxiang Chen, Ningde (CN); Ningsheng Wu, Ningde (CN); Ting Zheng, Ningde (CN); Wenlin Zhou, Ningde (CN); Yulian Zheng, Ningde (CN); Quankun Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/896,082

(22) Filed: Sep. 25, 2024

(65) Prior Publication Data
US 2025/0015441 A1    Jan. 9, 2025

Related U.S. Application Data

(63) Continuation of application No. PCT/CN2022/086390, filed on Apr. 12, 2022.

(51) Int. Cl.
*H01M 50/474* (2021.01)
*H01M 10/04* (2006.01)
*H01M 50/103* (2021.01)

(52) U.S. Cl.
CPC ..... *H01M 50/474* (2021.01); *H01M 10/0431* (2013.01); *H01M 50/103* (2021.01); *H01M 2220/20* (2013.01)

(58) Field of Classification Search
CPC ............. H01M 50/474; H01M 50/103; H01M 10/0431; H01M 2220/20
See application file for complete search history.

(56) References Cited

U.S. PATENT DOCUMENTS 7,709,143 B2    5/2010   Lee
2015/0364727 A1*   12/2015   Kim ...................... H01M 50/55
                                        429/185

(Continued)

FOREIGN PATENT DOCUMENTS

CN    104979506 A    10/2015
CN    107112472 A    8/2017

(Continued)

OTHER PUBLICATIONS

The World Intellectual Property Organization (WIPO) International Search Report and Written Opinion for PCT/CN2022/086390 Nov. 28, 2022 11 Pages (including translation).

(Continued)

*Primary Examiner* — Jane J Rhee
(74) *Attorney, Agent, or Firm* — ANOVA LAW GROUP, PLLC

(57) ABSTRACT

A battery cell includes a shell, an electrode assembly, and a first insulating member. The shell has an opening and a bottom wall opposite to the opening. The electrode assembly is accommodated in the shell. The first insulating member is used for separating the electrode assembly and the bottom wall. The first insulating member is provided with a first through hole, and projections of the electrode assembly and the first through hole on the bottom wall partially overlap or do not overlap in a thickness direction of the bottom wall.

18 Claims, 7 Drawing Sheets

(56) References Cited

U.S. PATENT DOCUMENTS

2017/0331090 A1* 11/2017 Li ..................... H01M 50/143
2021/0305655 A1    9/2021 Jang et al.

FOREIGN PATENT DOCUMENTS

| CN | 107394063 A  | 11/2017 |
| CN | 209592090 U  | 11/2019 |
| CN | 111435715 A  | 7/2020  |
| JP | 2004031263 A | 1/2004  |
| WO | 2017094228 A1| 6/2017  |

OTHER PUBLICATIONS

The European Patent Office (EPO) The Extended European Search Report for Application No. 22936815.4 Jun. 20, 2025 8 Pages.

* cited by examiner

BATTERY CELL, BATTERY, AND ELECTRICAL DEVICE

CROSS-REFERENCE TO RELATED APPLICATION

This application is a continuation of International Application No. PCT/CN2022/086390, filed on Apr. 12, 2022, the entire content of which is incorporated herein by reference.

TECHNICAL FIELD

The present application relates to the field of battery technologies, and in particular, to a battery cell, a battery, and an electrical device.

BACKGROUND ART

At present, with the rapid development of smart phones, tablet computers, electric vehicles, and the like, the application of lithium-ion batteries is increasingly wide, which has put forward higher requirements for lithium-ion batteries. For example, batteries are required to have better safety performance. Internal short circuits in batteries are one of the main reasons for power safety problems.

The short circuits in batteries may generate excessive electric heat and high temperatures, cause fires, and burn out electrical appliances, to threaten property and life safety. Therefore, how to reduce the risk of short circuits in batteries has become an urgent problem in the field of battery technologies.

SUMMARY

Embodiments of the present application provide a battery cell, a battery, and an electrical device to reduce the risk of a short circuit inside the battery cell.

In a first aspect, an embodiment of the present application provides a battery cell, including a shell, an electrode assembly, and a first insulating member; the shell has an opening and a bottom wall opposite to the opening; the electrode assembly is accommodated in the shell; the first insulating member is used for separating the electrode assembly and the bottom wall; and the first insulating member is provided with a first through hole, and projections of the electrode assembly and the first through hole on the bottom wall partially overlap or do not overlap in a thickness direction of the bottom wall.

In the foregoing technical solution, the projections of the electrode assembly and the first through hole on the bottom wall partially overlap or do not overlap in the thickness direction of the bottom wall, that is, at least a portion of the projection of the first through hole on the bottom wall is located outside the area covered by the projection of the electrode assembly on the bottom wall in the thickness direction of the bottom wall, the electrode assembly and the first through hole are misaligned, and there is a very small channel or no channel extending in the thickness direction of the bottom wall between the electrode assembly and the bottom wall of the shell, thereby reducing the risk that ions of the electrode assembly can reach the shell via the first through hole, and also reducing the risk that the ions of the electrode assembly reach the shell to cause a short circuit in the battery cell. Moreover, as the risk that the ions of the electrode assembly reach the shell is reduced, the risk of corrosion of the shell after the ions are in contact with the shell can also be reduced.

In some embodiments of the first aspect of the present application, the electrode assembly has a first end face facing the bottom wall, and the first end face exposes electrode plates of the electrode assembly.

In the foregoing technical solution, the first end face exposes the electrode plates of the electrode assembly, and ions of the electrode plates can deintercalate from the first end face. As the first end face faces the bottom wall and is misaligned with the first through hole on the first insulating member, there is a very small channel or no channel extending in the thickness direction of the bottom wall between the electrode assembly and the bottom wall of the shell, thereby reducing the risk that the ions of the electrode assembly can reach the shell via the first through hole, and also reducing the risk that the ions of the electrode assembly reach the shell to cause a short circuit in the battery cell. Moreover, as the risk that the ions of the electrode assembly reach the shell is reduced, the risk of corrosion of the shell after the ions are in contact with the shell can also be reduced.

In some embodiments of the first aspect of the present application, the electrode assembly includes a first electrode plate and a second electrode plate with opposite polarities, and the first electrode plate and the second electrode plate are wound around a winding axis perpendicular to the bottom wall; or the electrode assembly includes a separator, a plurality of first electrode plates, and a plurality of second electrode plates, where the first electrode plates and the second electrode plates have opposite polarities, the plurality of first electrode plates and the plurality of second electrode plates are alternately laminated in a first direction, the separator is continuously bent and includes a plurality of first laminated segments and a plurality of first bent segments, each of the first bent segments is used for connecting two adjacent first laminated segments, the plurality of first bent segments are distributed at two ends of the electrode assembly in a second direction, and the first direction, the second direction, and the thickness direction of the bottom wall are perpendicular to each other; or in some embodiments of the first aspect of the present application, the electrode assembly includes a plurality of first electrode plates and a second electrode plate, the first electrode plates and the second electrode plate have opposite polarities, the second electrode plate is continuously bent and includes a plurality of second laminated segments and a plurality of second bent segments, the plurality of second laminated segments and the plurality of first electrode plates are alternately laminated in the first direction, each of the second bent segments is used for connecting two adjacent second laminated segments, the plurality of second bent segments are distributed at two ends of the electrode assembly in the second direction, and the first direction, the second direction, and the thickness direction of the bottom wall are perpendicular to each other.

In the foregoing technical solution, the first electrode plate and second electrode plate of the electrode assembly are wound around the winding axis to form a wound electrode assembly, one end of the electrode assembly along the winding axis exposes the electrode plates, and the ions of the electrode plate can deintercalate from an end, facing the bottom wall, of the electrode assembly along the winding axis. The end, exposing the electrode plates, of the laminated electrode assembly faces the bottom wall, the electrode assembly is misaligned with the first through hole on the first insulating member, and there is a very small channel or no channel extending in the thickness direction of the bottom wall between the electrode assembly and the bottom wall of the shell, thereby reducing the risk that the ions of the electrode assembly can reach the shell via the first through hole, and also reducing the risk that the ions of the electrode assembly reach the shell to cause a short circuit in the battery cell. Moreover, as the risk that the ions of the electrode assembly reach the shell is reduced, the risk of corrosion of the shell after the ions are in contact with the shell can also be reduced.

In some embodiments of the first aspect of the present application, the shell has side walls, and the side walls are disposed on a periphery of the bottom wall; and the electrode assembly is a wound electrode assembly and includes a straight portion and two bent portions, the two bent portions are connected to two ends of the straight portion separately, and the first through hole is disposed between the bent portion and the side wall.

In the foregoing technical solution, the first through hole is disposed between the bent portion and the side wall to facilitate the arrangement of the first through hole.

In some embodiments of the first aspect of the present application, the first insulating member is rectangular, and the first through hole is disposed in at least one of four corners of the first insulating member.

In the foregoing technical solution, the first through hole is disposed in at least one of the four corners of the first insulating member, which facilitates the arrangement of the first through hole, facilitates positioning with an assembly apparatus via the first through hole during assembly of the battery cell, and avoids interference between the electrode assembly and the assembly apparatus during the assembly.

In some embodiments of the first aspect of the present application, the battery cell includes a plurality of electrode assemblies arranged side by side; and in an arrangement direction of the plurality of electrode assemblies, the first through hole is disposed between two adjacent bent portions.

In the foregoing technical solution, the first through hole is disposed between the two adjacent bent portions to facilitate the arrangement of the first through hole.

In some embodiments of the first aspect of the present application, two groups of first through holes are disposed between two adjacent electrode assemblies, the two groups of first through holes are spaced, and some straight portions are located between the two groups of first through holes.

In the foregoing technical solution, some straight portions are located between the two groups of first through holes, that is, the first through holes are disposed at two ends of the straight portions where the bent portions are disposed, and the straight portions of the two adjacent electrode assemblies can be closely disposed without reserving any space to avoid the first through holes, thereby fully using the internal space of the shell and increasing the energy density of the battery cell. In addition, some straight portions are located between the two groups of first through holes, so that the through holes are distributed more uniformly. During the assembly of the battery cell, if the first insulating member is positioned by the first through holes, the stability and accuracy of positioning can be improved, and the assembly quality of the battery cell can also be improved.

In some embodiments of the first aspect of the present application, the shell further includes side walls, and the side walls are disposed on the periphery of the bottom wall; and the battery cell further includes a second insulating member, and the second insulating member is used for separating the electrode assembly and the side walls.

In the foregoing technical solution, the second insulating member separates the electrode assembly and the side walls to prevent the contact between the electrode assembly and the side walls from causing a short circuit in the battery cell, so as to improve the safety of the battery cell.

In some embodiments of the first aspect of the present application, the second insulating member is integrally formed with the first insulating member.

In the foregoing technical solution, the second insulating member is integrally formed with the first insulating member, which can better separate the bottom wall of the shell and the electrode assembly, as well as the side walls of the shell and the electrode assembly, to avoid a short circuit in the battery cell, so as to improve the safety performance of the battery cell.

In some embodiments of the first aspect of the application, the battery cell further includes a support member, the support member is disposed between the first insulating member and the bottom wall, and the support member is provided with a second through hole corresponding to the first through hole.

In the foregoing technical solution, the support member is disposed between the first insulating member and the bottom wall, which can raise the position of the electrode assembly relative to the bottom wall, and reduce the risk of wrinkling of the electrode plates due to interference between the connection positions of the side walls and bottom wall of the shell and the electrode plates, thereby reducing the risk of a short circuit in the battery cell. The support member may be positioned with the assembly apparatus for assembling the battery cell via the second through hole, thereby improving the assembly quality. The support member is provided with the second through hole corresponding to the first through hole to facilitate accurate positioning between the first insulating member and the support member, so as to improve the assembly quality.

In a second aspect, an embodiment of the present application provides a battery, including the battery cell provided by the embodiments in the first aspect.

In the foregoing technical solution, there is no channel extending in the thickness direction of the bottom wall between the electrode assembly of the battery cell and the bottom wall of the shell, thereby eliminating a linear ion channel between the electrode assembly and the bottom wall, reducing the risk that ions of the electrode assembly can reach the shell via the first through hole, reducing the risk that the ions of the electrode assembly reach the shell to cause a short circuit in the battery cell, and improving the safety performance of the battery accordingly.

In a third aspect, an embodiment of the present application provides an electrical device, including the battery cell provided by the embodiments in the first aspect.

In the foregoing technical solution, there is no channel extending in the thickness direction of the bottom wall between the electrode assembly of the battery cell and the bottom wall of the shell, thereby eliminating a linear ion channel between the electrode assembly and the bottom wall, reducing the risk that ions of the electrode assembly can reach the shell via the first through hole, reducing the risk that the ions of the electrode assembly reach the shell to cause a short circuit in the battery cell, and improving the power safety of the electrical device accordingly.

BRIEF DESCRIPTION OF DRAWINGS

In order to explain the technical solutions in the embodiments of the present application more clearly, accompanying drawings required to use in the embodiments will be simply introduced below. It should be understood that the following drawings show only some embodiments of the present

Figure 1:
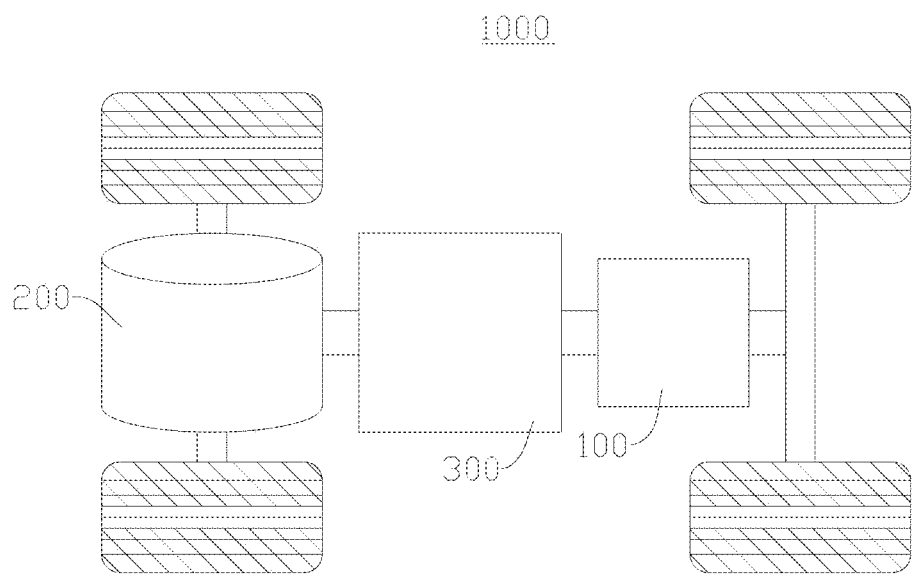
FIG. 1 is a schematic structural diagram of a vehicle provided by some embodiments of the present application.

Reference numerals: 1000—vehicle; 100—battery; 10—box; 11—mounting space; 12—first portion; 13—second portion; 20—battery cell; 21—shell; 211—opening; 212—bottom wall; 213—side wall; 2131—first side wall; 2132—second side wall; 22—electrode assembly; I—straight portion; II—bent portion; 221—first electrode plate; 222—second electrode plate; 2221—second laminated segment; 2222—second bent segment; 223—separator; 2231—first laminated segment; 2232—first bent segment; 23—end cover assembly; 231—end cover; 232—electrode terminal; 233 end cover protector; 24—protective film; 25—current collecting member; 26—first insulating member; 261—first through hole; 262—first crease; 27—second insulating member; 271—first separation portion; 272—second separation portion; 273—second crease; 28—support member; 281—second through hole; 200—controller; 300—motor; 2000—manufacturing device for a battery cell; 2100—provision apparatus; 2200—assembly apparatus; X—thickness direction of the bottom wall; Y—first direction; Z—second direction; M—fourth direction; N—Fifth direction.

DETAILED DESCRIPTION OF EMBODIMENTS

In order to make the objectives, technical solutions and advantages of the embodiments of the present application clearer, the technical solutions in the embodiments of the present application will be described clearly and completely below in conjunction with the accompanying drawings in the embodiments of the present application. Apparently, the described embodiments are some of the embodiments of the present application, not all of them. Generally, components of the embodiments of the present application described and shown in the drawings may be arranged and designed with various different configurations.

Therefore, the detailed descriptions of the embodiments of the present application provided in the drawings below are not intended to limit the scope of the present application, but are merely representatives of the selected embodiments of the present application. All other embodiments obtained by those of ordinary skill in the art based on the embodiments of the present application without creative efforts shall fall within the protection scope of the present application.

It should be noted that the embodiments in the present application and the features in the embodiments may be combined with each other on a non-conflict basis.

It should be noted that similar reference numerals and letters in the following drawings represent similar terms, so once a term is defined in a drawing, further definition and explanation are not required in the follow-up drawings.

In the description of the embodiments of the present application, indicative orientations or positional relationships are orientations or positional relationships shown based on the drawings, or commonly placed orientations or positional relationships when the product of the present application is used, or orientations or positional relationships commonly understood by those skilled in the art, are merely for convenience of describing the present application and for simplifying the description, but not for indicating or implying that an indicated apparatus or element must have a specific orientation, and must be constructed and operated in a specific orientation, and therefore, cannot be understood as limiting the present application. In addition, the terms "first", "second", "third", and the like are merely used for distinguishing the description and cannot be construed as indicating or implying relative importance.

At present, in view of the development of the market situation, use of power batteries is increasingly widespread. Power batteries are not only used in energy storage power systems such as hydropower, firepower, wind power, and solar power plants, but also widely used in electric vehicles such as electric bicycles, electric motorcycles, and electric vehicles, as well as in various fields such as military equipment and aerospace. With the continuous expansion of the application fields of power batteries, their market demand is also increasing.

A battery cell includes a shell, an electrode assembly, and a first insulating member. The first insulating member is used for separating the electrode assembly from a bottom wall of the shell, so as to avoid a contact short circuit between the electrode assembly and the bottom wall of the shell. In order to facilitate the assembly of the battery cell, the first insulating member is provided with a through hole. The through hole is used for fitting an assembly apparatus for assembling the battery cell to position the first insulating member on the assembly apparatus, so as to improve assembly quality.

The inventor found that ions in the electrode assembly reach the shell via the through hole to result in a short circuit inside the battery cell and cause safety problems. To prevent ions from reaching the shell via the through hole, the through hole may be sealed by pasting an adhesive tape on the first insulating member. However, the adhesive tape falls off and fails in sealing when immersed in an electrolytic solution for a long term. Moreover, after the ions of the electrode assembly are in contact with the shell, they may undergo chemical reactions with the shell to corrode the shell.

Based on the above considerations, in order to reduce passing of ions via the through hole, the inventor conducted in-depth research and designed a battery cell, where the battery cell includes a first insulating member used for separating an electrode assembly and a bottom wall of a shell, the first insulating member is provided with a first through hole, and projections of the electrode assembly and the first through hole on the bottom wall do not overlap in a thickness direction of the bottom wall. That is, the electrode assembly and the through hole are misaligned, the electrode assembly will not cover the first through hole, and there is no linear channel for ions to pass through between the electrode assembly and the bottom wall of the shell. Therefore, linear ion channels are eliminated, the risk that ions of the electrode assembly can reach the shell via the first through hole is reduced, and the risk that the ions of the electrode assembly reach the shell to cause a short circuit in the battery cell is also reduced. Moreover, as the risk that the ions of the electrode assembly reach the shell is reduced, the risk of shell corrosion caused by contact between the ions and the shell can also be reduced.

The battery cell disclosed in the embodiments of the present application may be used, but not limited to, in an electrical device such as a vehicle, a ship, or an aircraft. A power system of the electrical device may be constituted by the battery cell, the battery, or the like disclosed in the present application. In this case, the risk of passing of ions via the through hole is reduced, and the risk of a short circuit inside the battery is also reduced, thereby improving the safety performance of the battery cell.

The technical solutions described in the embodiments of the present application are applicable to batteries and electrical devices using batteries.

The electrical device may be a vehicle, a mobile phone, a portable device, a notebook computer, a ship, a spacecraft, an electric toy, an electric tool, or the like. The vehicle may be an oil-fueled vehicle, a gas vehicle, or a new energy vehicle. The new energy vehicle may be a battery electric vehicle, a hybrid electric vehicle, an extended-range vehicle, or the like. The spacecraft includes an airplane, a rocket, a space shuttle, a spaceship, or the like. The electric toy includes a fixed or mobile electric toy, such as a game console, an electric car toy, an electric ship toy, or an electric aircraft toy. The electric tool includes a metal cutting electric tool, a grinding electric tool, an assembly electric tool, or a railway electric tool, such as an electric drill, an electric grinder, an electric wrench, an electric screwdriver, an electric hammer, an impact electric drill, a concrete vibrator, or an electric planer. The embodiments of the present application do not limit the foregoing electrical devices.

For convenient description, the following embodiments are described by an example of a vehicle as an electrical device.

With reference to FIG. 1, a battery 100 is disposed inside a vehicle 1000, and the battery 100 may be disposed at a bottom, head, or tail of the vehicle 1000. The battery 100 may be used for supplying power to the vehicle 1000. For example, the battery 100 may be used as an operation power supply of the vehicle 1000.

The vehicle 1000 may further include a controller 200 and a motor 300. The controller 200 is used for controlling the battery 100 to supply power to the motor 300, for example, for a working power demand of the vehicle 1000 during startup, navigation and running.

In some embodiments of the present application, the battery 100 may be used not only as an operation power supply of the vehicle 1000, but also as a driving power supply of the vehicle 1000 to replace or partially replace fuel or natural gas to provide driving power for the vehicle 1000.

Figure 2:
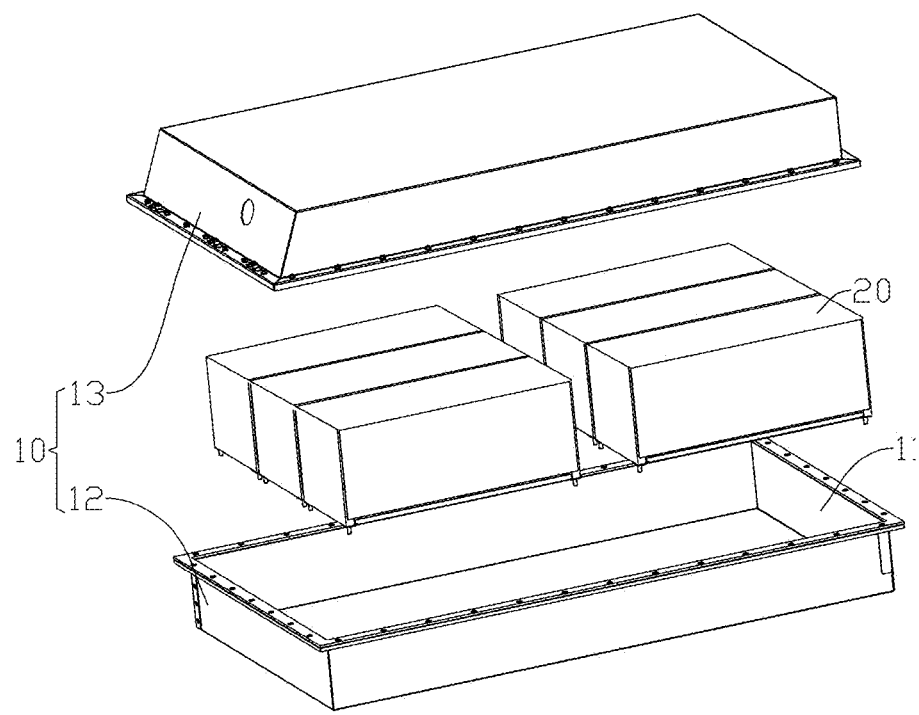
FIG. 2 is a schematic structural diagram of a battery provided by some embodiments of the present application.

With reference to FIG. 2, the battery 100 includes a box 10 and battery cells 20, where the battery cells 20 are accommodated in the box 10.

The box 10 is used for providing a mounting space 11 for the battery cells 20. In some embodiments, the box 10 may include a first portion 12 and a second portion 13, and the first portion 12 and the second portion 13 cover each other to jointly confine the mounting space 11 for accommodating the battery cells 20. Of course, the connection between the first portion 12 and the second portion 13 may be sealed by a sealing member (not shown), which may be a sealing ring, a sealant, or the like.

The first portion 12 and the second portion 13 may be in various shapes, such as rectangles or cylinders. The first portion 12 may be opened on one side to form a hollow structure with an accommodating cavity for accommodating the battery cells 20, the second portion 13 may also be opened on one side to form a hollow structure with an accommodating cavity for accommodating the battery cells 20, and the open side of the second portion 13 covers the open side of the first portion 12 to form the box 10 with the mounting space 11. Alternatively, the first portion 12 may be opened on one side to form a hollow structure with an accommodating cavity for accommodating the battery cells 20, the second portion 13 is a of plate-like structure, and the second portion 13 covers the open side of the first portion 12 to form the box 10 with the mounting space 11.

There may be one or more battery cells 20 in the battery 100. If there is a plurality of battery cells 20, the plurality of battery cells 20 may be in series connection, parallel connection, or series-parallel connection. The series-parallel connection refers to a combination of series connection and parallel connection in the plurality of battery cells 20. The plurality of battery cells 20 may be directly connected in series, in parallel, or in series and parallel together, and then the whole formed by the plurality of battery cells 20 is accommodated in the box 10. Alternatively, the plurality of battery cells 20 may be first connected in series, in parallel, or in series and parallel to form a battery module, then a plurality of battery modules are connected in series, in parallel, or in series and parallel to form a whole, and the whole is accommodated in the box 10. The battery cells 20 may be cylindrical, flat, cuboid, or in other shapes. FIG. 2 illustrates square battery cells 20.

In some embodiments, the battery 100 may further include a current collecting component (not shown), and the plurality of battery cells 20 may be electrically connected through the current collecting component to implement the parallel, series, or series-parallel connection of the plurality of battery cells 20.

Figure 3:
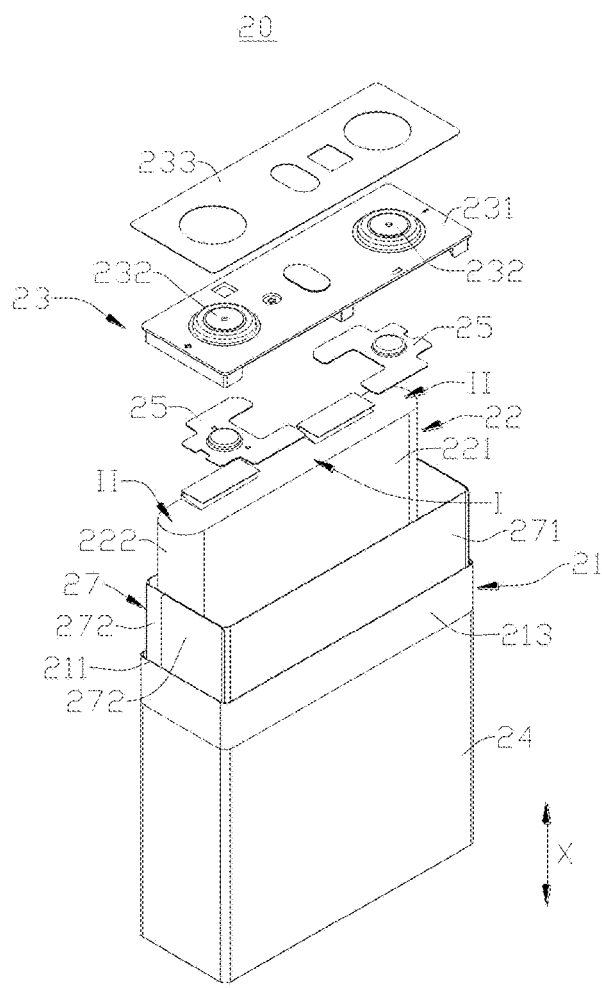
FIG. 3 is an exploded view of a battery cell provided by some embodiments of the present application.

With reference to FIG. 3, the battery cell 20 may include a shell 21, an electrode assembly 22, and an end cover assembly 23. The shell 21 has an opening 211, the electrode assembly 22 is accommodated in the shell 21, and the end cover assembly 23 is used for covering the opening 211.

The shell 21 may be in various shapes, such as cylindrical or cuboid. The shape of the shell 21 may be determined according to a specific shape of the electrode assembly 22. For example, if the electrode assembly 22 is of a cylindrical structure, the shell 21 may be of a cylindrical structure; or if the electrode assembly 22 is of a rectangular structure, the shell 21 may be of a rectangular structure. FIG. 3 illustrates that the shell 21 and the electrode assembly 22 are square.

A material of the shell 21 may be various, such as copper, iron, aluminum, stainless steel, or aluminum alloy, and is not specially limited in the embodiments of the present application.

In some embodiments, a protective film 24 is further disposed on an outer surface of the shell 21, and the protective film 24 covers the outer surface of the shell 21. The protective film 24 can achieve effects of insulation, high temperature resistance, and the like. The protective film 24 may be a blue film.

The electrode assembly 22 may include a positive electrode plate (not shown), a negative electrode plate (not shown), and a separator 223 (not shown). The electrode assembly 22 may be of a wound structure formed by winding the positive electrode plate, the separator 223, and the negative electrode plate, or a laminated structure formed by laminating the positive electrode plate, the separator 223, and the negative electrode plate. The electrode assembly 22 further includes a positive electrode tab (not shown) and a negative electrode tab (not shown), a positive electrode current collector not coated with a positive electrode active material layer in the positive electrode plate may be used as the positive electrode tab, and a negative electrode current collector not coated with a negative electrode active material layer in the negative electrode plate may be used as the negative electrode tab.

The end cover assembly 23 includes an end cover 231 and electrode terminals 232, where the electrode terminals 232 are disposed on the end cover 231. The end cover 231 is used for covering the opening 211 of the shell 21 to form a closed accommodating space (not shown), and the accommodating space is used for accommodating the electrode assembly 22. The accommodating space is further used for accommodating an electrolyte, such as an electrolytic solution. The end cover assembly 23 serves as a component for outputting electrical energy of the electrode assembly 22. The electrode terminals 232 in the end cover assembly 23 are used for electrical connection with the electrode assembly 22, that is, the electrode terminals 232 are electrically connected to the tabs of the electrode assembly 22. For example, the electrode terminals 232 are connected to the tabs through current collecting members 25 to achieve electrical connection between the electrode terminals 232 and the tabs.

It should be noted that the shell 21 may have one or two openings 211. If the shell 21 has one opening 211, there may also be one end cover assembly 23, two electrode terminals 232 may be disposed in the end cover assembly 23, the two electrode terminals 232 are used for electrical connection with the positive electrode tab and negative electrode tab of the electrode assembly 22 separately, and the two electrode terminals 232 in the end cover assembly 23 are a positive electrode terminal 232 and a negative electrode terminal 232 separately. If the shell 21 has two openings 211, for example, the two openings 211 are disposed on two opposite sides of the shell 21, there may also be two end cover assemblies 23, and the two end cover assemblies 23 cover the two openings 211 of the shell 21. In this case, the electrode terminal 232 in one end cover assembly 23 is a positive electrode terminal 232 used for electrical connection with the positive electrode tab of the electrode assembly 22; and the electrode terminal 232 in the other end cover assembly 23 is a negative electrode terminal 232 used for electrical connection with the negative electrode tab of the electrode assembly 22.

In some embodiments, the end cover assembly 23 further includes an end cover protector 233, and the end cover protector 233 is mounted on a surface of the end cover 231 to protect the end cover 231.

Figure 4:
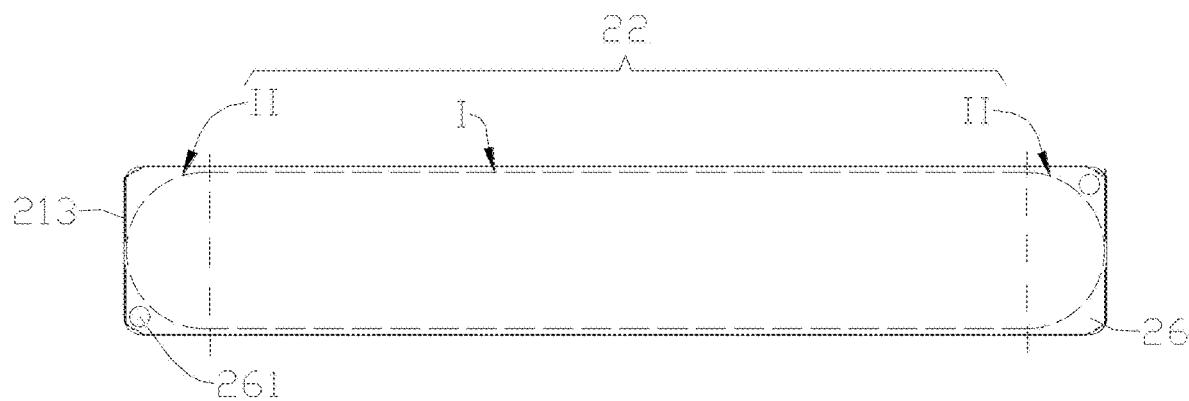
FIG. 4 is a schematic diagram of a relative relationship between a first insulating member and an electrode assembly provided by some embodiments of the present application.

As shown in FIG. 4, in some embodiments, the battery cell 20 includes a shell 21, an electrode assembly 22, and a first insulating member 26; the shell 21 has an opening 211 and a bottom wall 212 opposite to the opening 211; the electrode assembly 22 is accommodated in the shell 21; the first insulating member 26 is used for separating the electrode assembly 22 from the bottom wall 212; and the first insulating member 26 is provided with a first through hole 261, and projections of the electrode assembly 22 and the first through hole 261 on the bottom wall 212 partially overlap or do not overlap in a thickness direction of the bottom wall 212.

The opening 211 of the shell 21 is opposite to the bottom wall 212 in the thickness direction X of the bottom wall. The electrode assembly 22 enters the shell 21 from the opening 211. In the thickness direction X of the bottom wall, the first insulating member 26 is located between the electrode assembly 22 and the bottom wall 212. The first insulating member 26 is used for separating the electrode assembly 22 from the bottom wall 212, indicating that the first insulating member 26 is located between the electrode assembly 22 and the bottom wall 212 to prevent contact between the electrode assembly 22 and the bottom wall 212, so as to avoid a short circuit in the battery cell 20 due to the contact between the electrode assembly 22 and the bottom wall 212.

The projections of the electrode assembly 22 and the first through hole 261 on the bottom wall 212 partially overlap in the thickness direction X of the bottom wall, indicating that a portion of the projection of the first through hole 261 on the bottom wall 212 is located outside an area covered by the projection of the electrode assembly 22 on the bottom wall 212 in the thickness direction X of the bottom wall, and a channel extending in the thickness direction X of the bottom wall between the electrode assembly 22 and the bottom wall 212 of the shell 21 is very small.

The projections of the electrode assembly 22 and the first through hole 261 on the bottom wall 212 do not overlap in the thickness direction X of the bottom wall, indicating that all of the projection of the first through hole 261 on the bottom wall 212 is located outside an area covered by the projection of the electrode assembly 22 on the bottom wall 212 in the thickness direction X of the bottom wall, and there is no channel extending in the thickness direction X of the bottom wall between the electrode assembly 22 and the bottom wall 212 of the shell 21, that is, a linear ion channel between the electrode assembly 22 and the bottom wall 212 is eliminated.

The projections of the electrode assembly 22 and the first through hole 261 on the bottom wall 212 partially overlap or do not overlap in the thickness direction X of the bottom wall, that is, at least a portion of the projection of the first through hole 261 on the bottom wall 212 is located outside the area covered by the projection of the electrode assembly 22 on the bottom wall 212 in the thickness direction X of the bottom wall, the electrode assembly 22 and the first through hole 261 are misaligned, and there is a very small channel or no channel extending in the thickness direction X of the bottom wall between the electrode assembly 22 and the bottom wall 212 of the shell 21, thereby reducing the risk that ions of the electrode assembly 22 can reach the shell 21 via the first through hole 261, and also reducing the risk that the ions of the electrode assembly 22 reach the shell 21 to cause a short circuit in the battery cell 20. Moreover, as the risk that the ions of the electrode assembly 22 reach the shell 21 is reduced, the risk of corrosion of the shell 21 due to contact between the ions and the shell 21 can also be reduced. When the battery cell 20 is assembled, the first through hole 261 is used for fitting an assembly apparatus 2200 of the battery cell 20 to position the first insulating member 26 on the assembly apparatus 2200, so as to improve assembly quality. Because the projections of the electrode assembly 22 and the first through hole 261 on the bottom wall 212 do not overlap in the thickness direction X of the bottom wall, the electrode assembly 22 and the assembly apparatus 2200 cannot interfere with each other when the battery cell 20 is assembled.

Figure 5:
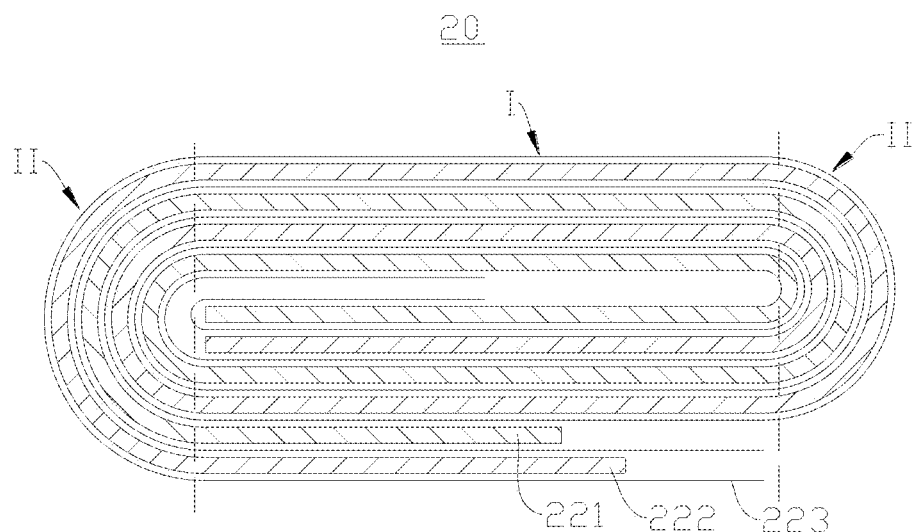
FIG. 5 is a schematic structural diagram of an electrode assembly provided by some embodiments of the present application.
Figure 6:
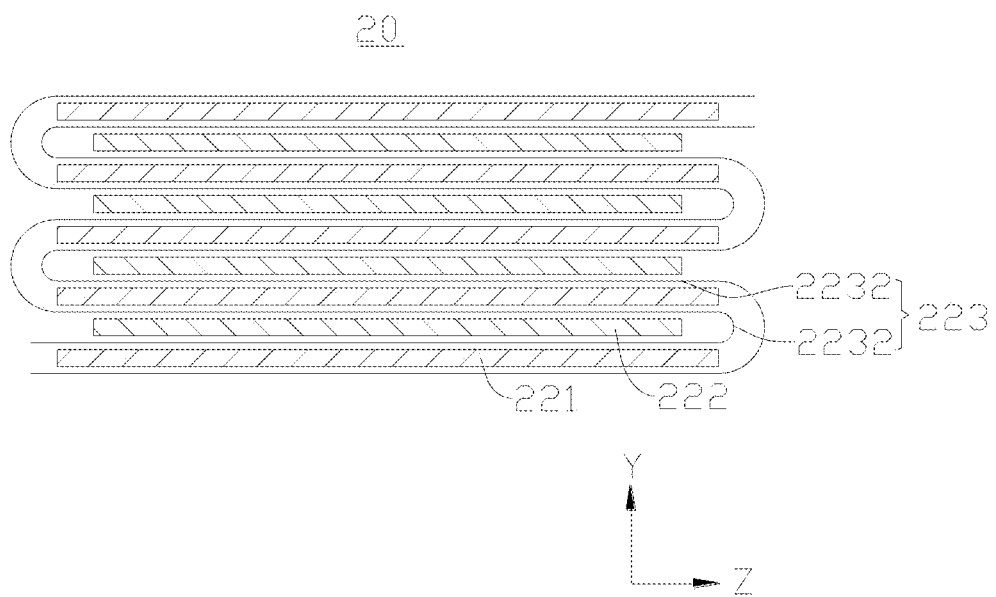
FIG. 6 is a schematic structural diagram of an electrode assembly provided by other embodiments of the present application.
Figure 7:
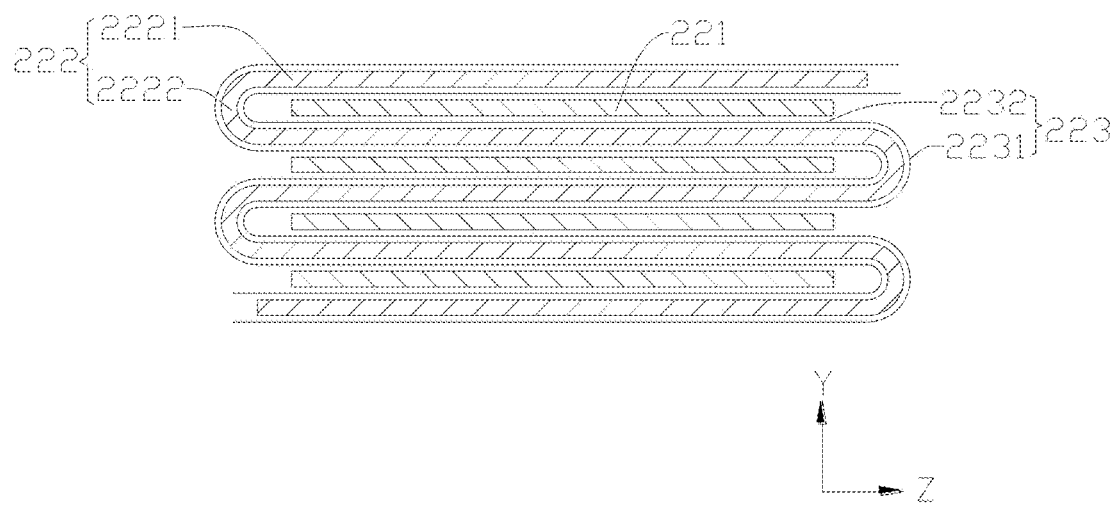
FIG. 7 is a schematic structural diagram of an electrode assembly provided by still other embodiments of the present application.

With reference to FIGS. 5, 6, and 7, in some embodiments, the electrode assembly 22 has a first end face (not shown) facing the bottom wall 212, and the first end face exposes the electrode plates of the electrode assembly 22.

The separator 223 of the electrode assembly 22 is used for separating the positive and negative electrode plates, so as to avoid a short circuit in the electrode assembly 22 due to contact between the positive and negative electrode plates. The first end face of the electrode assembly 22 exposes the electrode plates, indicating that the electrode plates are not covered by the separator, and the ions of the electrode assembly 22 can move from the first end face towards the bottom wall 212. The electrode tabs of the electrode assembly 22 are located on a second end face opposite to the first end face. An end, where the electrode tabs are disposed, of the electrode assembly 22 is not covered by the separator 223. The tabs of the electrode assembly 22 are generally disposed towards the opening 211 of the shell 21, the first end face of the electrode assembly 22 faces the bottom wall 212, and the tabs are located on the second end face opposite to the first end face, thereby facilitating the arrangement of the tabs of the electrode assembly 22 towards the opening 211 of the shell 21. It can be understood that, for the electrode assembly 22 with a tab on a single side, an end, opposite to the tab, of the electrode assembly 22 is also not covered by the separator 223. An end, at which the tabs are not disposed and which is not covered by the separator 223, of the electrode assembly 22 faces the bottom wall 212, that is, the first end face exposes the electrode plates of the electrode assembly 22, and ions of the electrode plates can deintercalate from the first end face. As the first end face faces the bottom wall 212 and is misaligned with the first through hole 261 on the first insulating member 26, there is a very small channel or no channel extending in the thickness direction X of the bottom wall between the electrode assembly 22 and the bottom wall 212 of the shell 21, thereby reducing the risk that the ions of the electrode assembly 22 can reach the shell 21 via the first through hole 261, and also reducing the risk that the ions of the electrode assembly 22 reach the shell 21 to cause a short circuit in the battery cell 20. Moreover, as the risk that the ions of the electrode assembly 22 reach the shell 21 is reduced, the risk of corrosion of the shell 21 after the ions are in contact with the shell 21 can also be reduced.

The electrode assembly 22 may be in various forms, as shown in FIG. 5, in some embodiments, the electrode assembly 22 includes a first electrode plate 221 and a second electrode plate 222 with opposite polarities, and the first electrode plate 221 and the second electrode plate 222 are wound around a winding axis perpendicular to the bottom wall 212. The separator 223 is used for separating the first electrode plate 221 and the second electrode plate 222.

The first electrode plate 221 and the second electrode plate 222 are wound around the winding axis to form a wound electrode assembly. For the wound electrode assembly, two axial ends of the electrode assembly 22 are not covered by the separator 223, so that both the first electrode plate 221 and the second electrode plate 222 are exposed along the two axial ends of the electrode assembly 22. All the tabs of the electrode assembly 22 are located at one end (second end face) facing the opening 211 in the axial direction of the electrode assembly 22, and the other end (first end face) in the axial direction of the electrode assembly 22 faces the bottom wall 212, so that the winding axis of the electrode assembly 22 is perpendicular to the bottom wall 212 (an extension direction of the winding axis is consistent with the thickness direction X of the bottom wall) to facilitate the connection between the tabs and the electrode terminals 232 on the end cover. The ions of the electrode assembly 22 can move close to the bottom wall 212 in the extension direction of the winding axis. The projection of the electrode assembly 22 on the bottom wall 212 does not overlap the projection of the first through hole 261 on the bottom wall 212 in the thickness direction X of the bottom wall, and there is no channel extending in the thickness direction X of the bottom wall between the electrode assembly 22 and the bottom wall 212 of the shell 21, thereby eliminating a linear ion channel between the electrode assembly 22 and the bottom wall 212, reducing the risk that the ions of the electrode assembly 22 can reach the shell 21 via the first through hole 261, and also reducing the risk that the ions of the electrode assembly 22 reach the shell 21 to cause a short circuit in the battery cell 20. Moreover, as the risk that the ions of the electrode assembly 22 reach the shell 21 is reduced, the risk of corrosion of the shell 21 after the ions are in contact with the shell 21 can also be reduced.

As shown in FIG. 6, in other embodiments, the electrode assembly 22 includes a separator 223, a plurality of first electrode plates 221, and a plurality of second electrode plates 222, where the first electrode plates 221 and the second electrode plates 222 have opposite polarities, the plurality of first electrode plates 221 and the plurality of second electrode plates 222 are alternately laminated in a first direction Y, the separator 223 is continuously bent and includes a plurality of first laminated segments 2231 and a plurality of first bent segments 2232, each of the first bent segments 2232 is used for connecting two adjacent first laminated segments 2231, the plurality of first bent segments 2232 are distributed at two ends of the electrode assembly 22 in a second direction Z, and the first direction Y, the second direction Z, and the thickness direction X of the bottom wall are perpendicular to each other.

In this embodiment, the plurality of first electrode plates 221 are independent of each other, and the plurality of second electrode plates 222 are independent of each other. The separator 223 is of a continuous strip structure. In the first direction Y, a second electrode plate 222 is disposed between two adjacent first electrode plates 221, and a first electrode plate 221 is disposed between two adjacent second electrode plates 222, so that the plurality of first electrode plates 221 and the plurality of second electrode plates 222 are alternately laminated in the first direction Y. In the first direction Y, a first laminated segment 2231 is disposed between the first electrode plate 221 and the second electrode plate 222 that are adjacent, and the two adjacent first laminated segments 2231 are connected by a first bent segment. Some of the plurality of first bent segments 2232 are distributed at one end of the electrode assembly 22 in the second direction Z, and the other first bent segments 2232 are distributed at the other end of the electrode assembly 22 in the second direction Z. The plurality of first bent segments 2232 cover two ends of the first electrode plates 221 and the second electrode plates 222 in the second direction Z. The two ends of the first electrode plates 221 and the second electrode plates 222 in a third direction are not covered by the separator 223, so that the two ends of the first electrode plates 221 and the second electrode plates 222 are exposed in the third direction. The end, where the tabs are not disposed, of the electrode assembly 22 in the third direction faces the bottom wall 212. The first direction Y, the second direction Z, and the third direction are perpendicular to each other, and the third direction is consistent with the thickness direction X of the bottom wall. Two ends of the electrode assembly 22 in the thickness direction X of the bottom wall are not covered by the separator 223, the tabs are located at the end, not covered by the separator 223, of the electrode assembly 22, and a direction in which the tabs are located at the two ends, not covered by the separator 223, of the electrode assembly 22 is consistent with the thickness direction X of the bottom wall and perpendicular to the first direction Y and the second direction Z, thereby facilitating the arrangement of the tabs towards the opening 211 of the shell 21.

Because the two ends of the first electrode plates 221 and the second electrode plates 222 in the thickness direction X of the bottom wall are not covered by the separator 223, the ions of the electrode assembly 22 can move close to the bottom wall 212 in the thickness direction X of the bottom wall. The projection of the electrode assembly 22 on the bottom wall 212 does not overlap the projection of the first through hole 261 on the bottom wall 212 in the thickness direction X of the bottom wall, and there is no channel extending in the thickness direction X of the bottom wall between the electrode assembly 22 and the bottom wall 212 of the shell 21, thereby eliminating a linear ion channel between the electrode assembly 22 and the bottom wall 212, reducing the risk that the ions of the electrode assembly 22 can reach the shell 21 via the first through hole 261, and also reducing the risk that the ions of the electrode assembly 22 reach the shell 21 to cause a short circuit in the battery cell 20. Moreover, as the risk that the ions of the electrode assembly 22 reach the shell 21 is reduced, the risk of corrosion of the shell 21 after the ions are in contact with the shell 21 can also be reduced.

As shown in FIG. 7, in still other embodiments, the electrode assembly 22 includes a plurality of first electrode plates 221 and a second electrode plate 222, the first electrode plates 221 and the second electrode plate 222 have opposite polarities, the second electrode plate 222 is continuously bent and includes a plurality of second laminated segments 2221 and a plurality of second bent segments 2222, the plurality of second laminated segments 2221 and the plurality of first electrode plates 221 are alternately laminated in the first direction Y, each second bent segment 2222 is used for connecting two adjacent second laminated segments 2221, the plurality of second bent segments 2222 are distributed at two ends of the electrode assembly 22 in the second direction Z, and the first direction Y, the second direction Z, and the thickness direction X of the bottom wall are perpendicular to each other.

In this embodiment, the plurality of first electrode plates 221 are independent of each other, and the second electrode plate 222 and the separator 223 are of continuous strip structures. The plurality of second laminated segments 2221 are laminated in the first direction Y, and the two adjacent second laminated segments 2221 are connected by a second bent segment 2222. In the first direction Y, a second laminated segment 2221 is disposed between two adjacent first electrode plates 221, and a first electrode plate 221 is disposed between two adjacent second laminated segments 2221, so that the plurality of second laminated segments 2221 and the plurality of first electrode plates 221 are alternately laminated in the first direction Y.

The separator 223 separates the second electrode plate 222 and the plurality of first electrode plates 221, the separator 223 is continuously bent and includes a plurality of first laminated segments 2231 and a plurality of first bent segments 2232, a first laminated segment 2231 is disposed between the first laminated segment 2231 and the first electrode plate 221 that are adjacent, the two adjacent first laminated segments 2231 are connected by a first bent segment 2232, and the first bent segments 2232 cover outer sides of the second bent segments 2222. The plurality of first bent segments 2232 cover two ends of the first electrode plates 221 and the second electrode plate 222 in the second direction Z. The two ends of the first electrode plates 221 and the second electrode plate 222 in a third direction are not covered by the separator 223, so that the two ends of the first electrode plates 221 and the second electrode plate 222 are exposed in the third direction. The end, where the tabs are not disposed, of the electrode assembly 22 in the third direction faces the bottom wall 212. The first direction Y, the second direction Z, and the third direction are perpendicular to each other, and the third direction is consistent with the thickness direction X of the bottom wall. Two ends of the electrode assembly 22 in the thickness direction X of the bottom wall are not covered by the separator 223, the tabs are located at the end, not covered by the separator 223, of the electrode assembly 22, and a direction in which the tabs are located at the two ends, not covered by the separator 223, of the electrode assembly 22 is consistent with the thickness direction X of the bottom wall and perpendicular to the first direction Y and the second direction Z, thereby facilitating the arrangement of the tabs towards the opening 211 of the shell 21.

With continued reference to FIG. 4, in some embodiments, the shell 21 has side walls 213, and the side walls 213 are disposed on a periphery of the bottom wall 212; and the electrode assembly 22 is a wound electrode assembly and includes a straight portion I and two bent portions II, the two bent portions II are connected to two ends of the straight portion I separately, and the first through hole 261 is disposed between the bent portion II and the side wall 213.

The first through hole 261 is disposed between the bent portion II and the side wall 213, indicating that the first through hole 261 is disposed in a space enclosed by a peripheral surface of the bent portion II and an inner surface of the side wall 213. In other embodiments, the first through hole 261 may alternatively be disposed between a straight area and the side wall 213.

The first through hole 261 is disposed between the bent portion II and the side wall 213 to facilitate the arrangement of the first through hole 261.

The first insulating member 26 is in various shapes. For example, in some embodiments, as shown in FIG. 4, the first insulating member 26 is rectangular, and the first through hole 261 is disposed in at least one of four corners of the first insulating member 26.

In an embodiment where the battery cell 20 has one electrode assembly 22, one or a plurality of first through holes 261 may be disposed on the bottom wall 212, where the plurality refers to two or more. FIG. 4 shows a case where a plurality of first through holes 261 are disposed on the bottom wall 212. In FIG. 4, a quantity of the first through holes 261 is two, and the two first through holes 261 are disposed at two diagonals among the four corners of the first insulating member 26 to improve the stability of positioning fit between the first insulating member 26 and the assembly apparatus 2200 via the first through holes 261.

Figure 8:
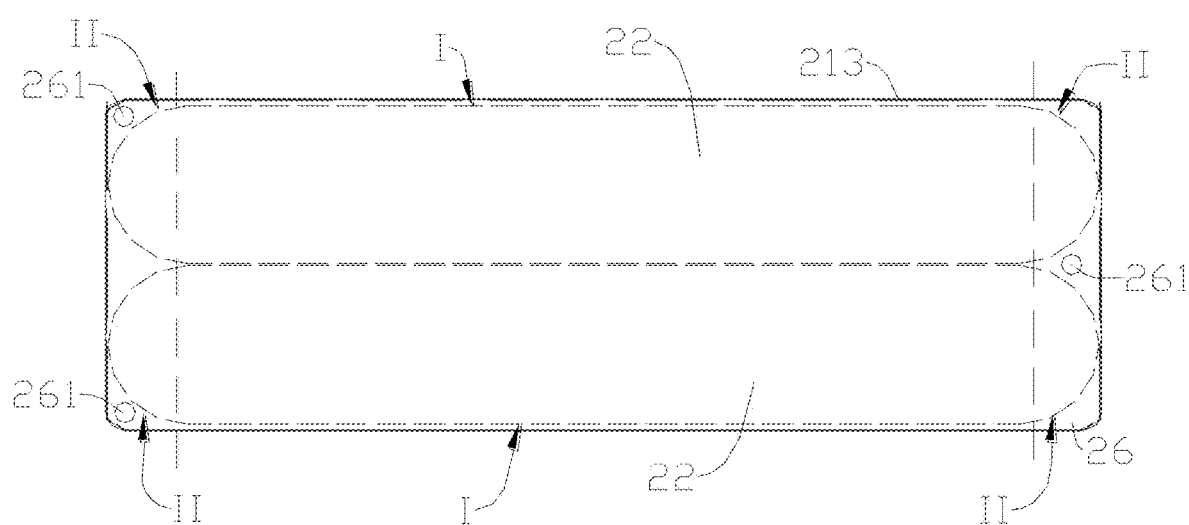
FIG. 8 is a schematic diagram of a relative relationship between a first insulating member and an electrode assembly provided by other embodiments of the present application.

As shown in FIG. 8, in an embodiment where the battery cell 20 includes a plurality of electrode assemblies 22, a first through hole 261 may be disposed in at least one of four corners of the first insulating member 26, and a first through hole 261 may also be disposed between bent portions II of two adjacent electrode assemblies 22.

In other embodiments, an outer contour of the first insulating member 26 may be in a shape matching an outer contour of the electrode assembly 22.

Figure 15:
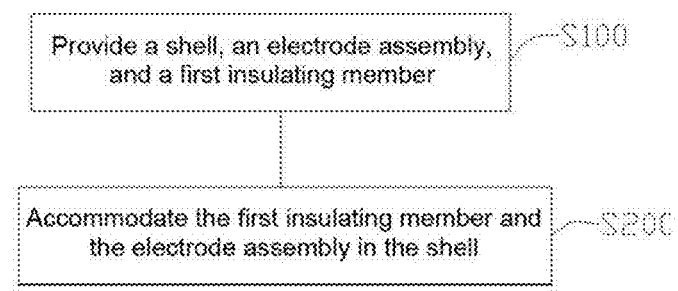
FIG. 15 is a flowchart of a manufacturing method for a battery cell provided by some embodiments of the present application.

The first through hole 261 is disposed in at least one of the four corners of the first insulating member 26, which facilitates the arrangement of the first through hole 261, facilitates positioning with an assembly apparatus 2200 via the first through hole 261 during assembly of the battery cell 20, and avoids interference between the electrode assembly 22 and the assembly apparatus 2200 (as shown in FIG. 15) during the assembly.

Figure 9:
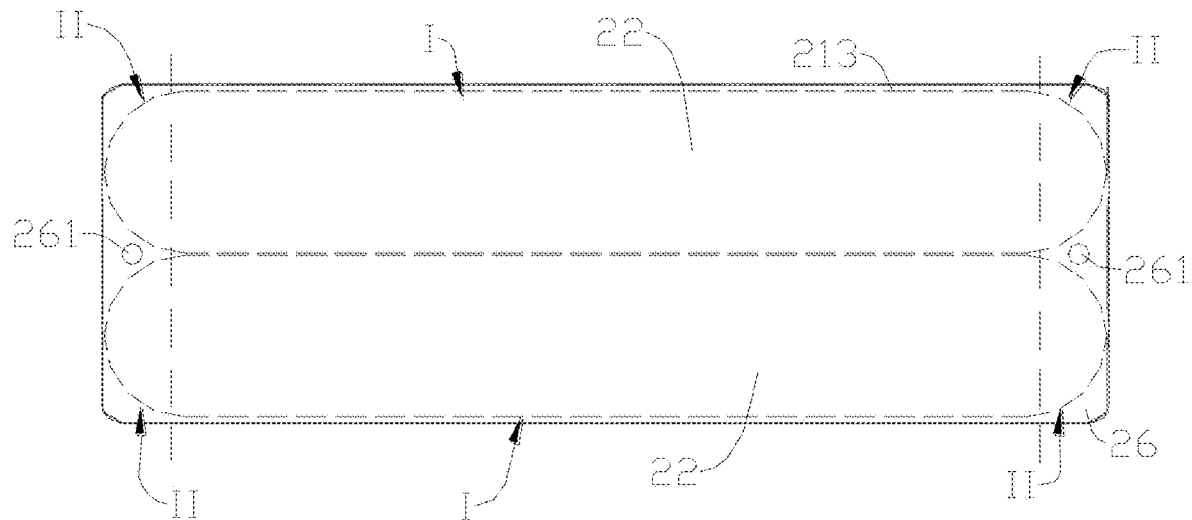
FIG. 9 is a schematic diagram of a relative relationship between a first insulating member and an electrode assembly provided by still other embodiments of the present application.

As shown in FIG. 8 and FIG. 9, in some embodiments, the battery cell 20 includes a plurality of electrode assemblies 22 arranged side by side; and in an arrangement direction of the plurality of electrode assemblies 22, the first through hole 261 is disposed between two adjacent bent portions II.

The arrangement direction of the two bent portions II of the electrode assemblies 22 is perpendicular to that of the plurality of electrode assemblies 22.

One first through hole 261 or a plurality of first through holes 261 may be disposed between the two adjacent bent portions II. The plurality refers to two or more. Alternatively, a first through hole 261 is disposed between every two adjacent bent portions II, or a first through hole 261 is disposed between some of the two adjacent bent portions II.

In an embodiment where a first through hole 261 is disposed between two adjacent bent portions II, a first through hole 261 may also be disposed in at least one of the four corners of the rectangle of the first insulating member 26 (as shown in FIG. 8). In other embodiments, a first through hole 261 may be disposed only between two adjacent bent portions II (as shown in FIG. 9).

The first through hole 261 is disposed between the two adjacent bent portions II to facilitate the arrangement of the first through hole 261.

In some embodiments, two groups of first through holes 261 are disposed between two adjacent electrode assemblies 22, the two groups of first through holes 261 are spaced, and some straight portions I are located between the two groups of first through holes 261.

Each group includes a plurality of first through holes 261, some first through holes 261 in one group of first through holes 261 located between the two adjacent electrode assemblies 22 are disposed at one end of a straight area, and the other first through holes 261 are disposed at the other end of the straight area, so that some straight portions I are located between two first through holes 261. That is, the first through holes 261 in each group of first through holes 261 are disposed at two ends of the straight portions I where the bent portions II are disposed, and the straight portions I of the two adjacent electrode assemblies 22 can be closely disposed without reserving any space to avoid the first through holes 261, thereby fully using the internal space of the shell 21 and increasing the energy density of the battery cell 20. In addition, some straight portions I are located between the two first through holes 261, so that the through holes are distributed more uniformly. During the assembly of the battery cell 20, if the first insulating member 26 is positioned by the first through holes 261, the stability and accuracy of positioning can be improved, and the assembly quality of the battery cell 20 can also be improved.

Figure 10:
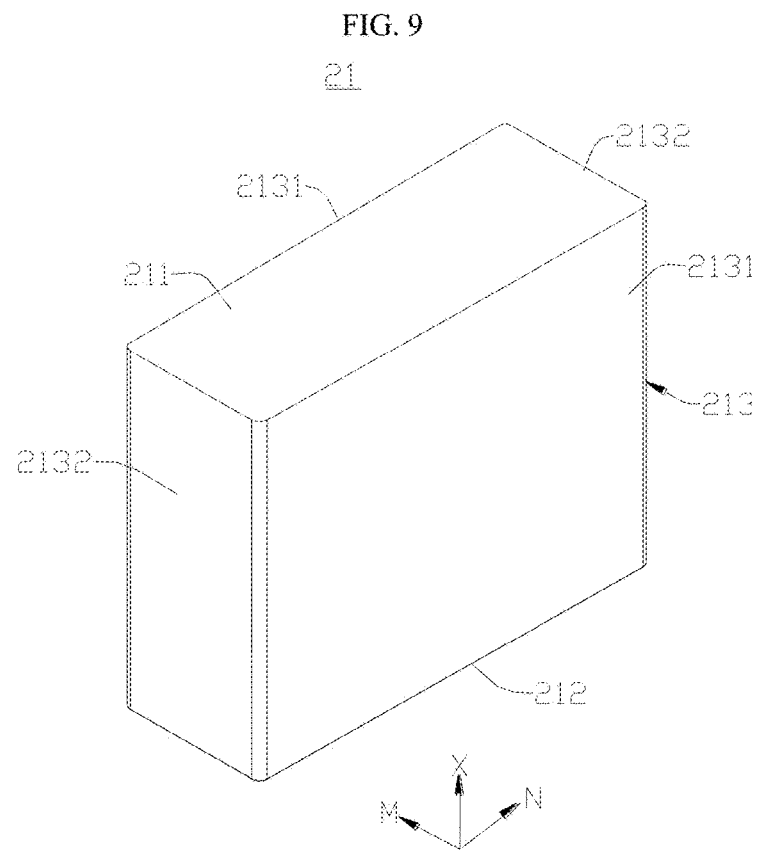
FIG. 10 is a schematic structural diagram of a shell provided by some embodiments of the present application.
Figure 11:
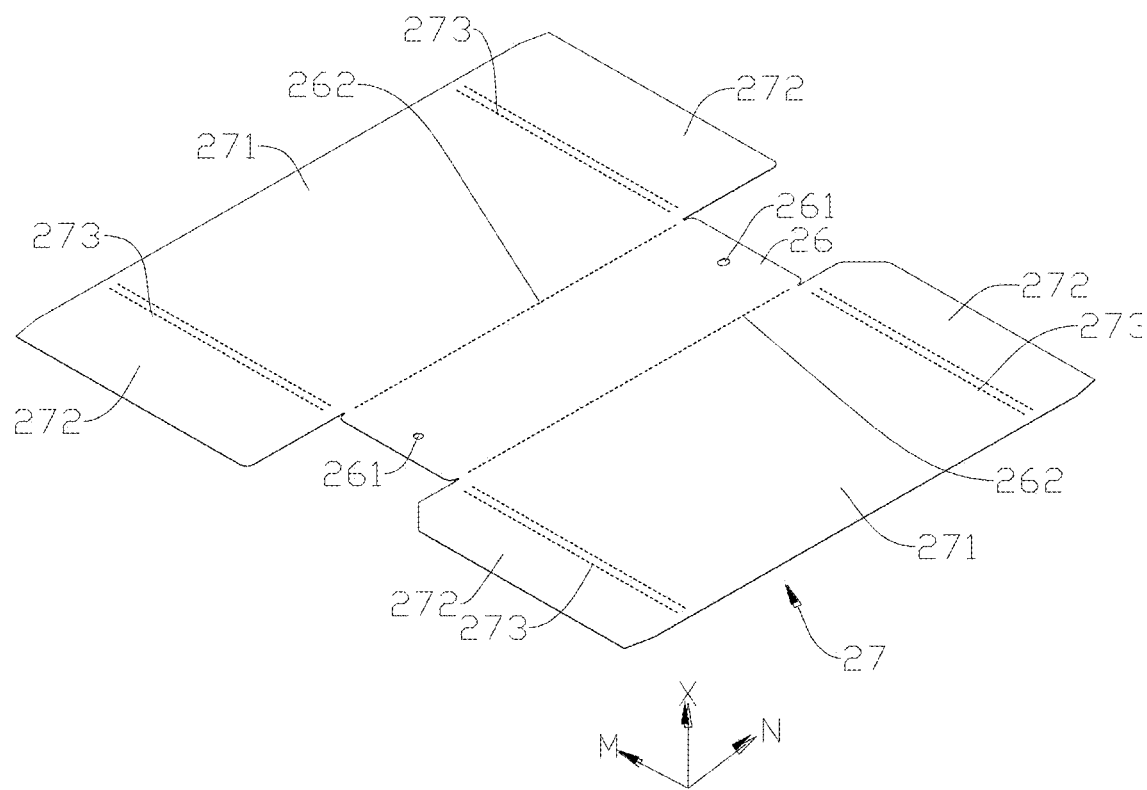
FIG. 11 is a schematic structural diagram of a first insulating member and a second insulating member after connection according to some embodiments of the present application.

As shown in FIG. 10 and FIG. 11, in some embodiments, the shell 21 further includes side walls 213, and the side walls 213 are disposed on a periphery of the bottom wall 212; and the battery cell 20 further includes a second insulating member 27, and the second insulating member 27 is used for separating the electrode assembly 22 and the side walls 213.

The second insulating member 27 may be fixed on a peripheral surface of the electrode assembly 22 or an inner wall of the side walls 213. The second insulating member 27 is used for separating the electrode assembly 22 and the side walls 213, indicating that the second insulating member 27 is disposed between the electrode assembly 22 and the side walls 213 to avoid contact between the electrode assembly 22 and the side walls 213 of the shell 21, so as to prevent a short circuit in the battery cell 20.

The second insulating member 27 separates the electrode assembly 22 and the side walls 213 to prevent the contact between the electrode assembly 22 and the side walls 213 from causing a short circuit in the battery cell 20, so as to improve the safety of the battery cell 20.

As shown in FIG. 10 and FIG. 11, in some embodiments, the second insulating member 27 is integrally formed with the first insulating member 26.

In other embodiments, the second insulating member 27 may be split from the first insulating member 26, or the first insulating member 26 and the second insulating member 27 that are split may be connected into a whole.

The second insulating member 27 is integrally formed with the first insulating member 26, which can better separate the bottom wall 212 of the shell 21 and the electrode assembly 22, as well as the side walls 213 of the shell 21 and the electrode assembly 22, to avoid a short circuit in the battery cell 20, so as to improve the safety performance of the battery cell 20.

Figure 12:
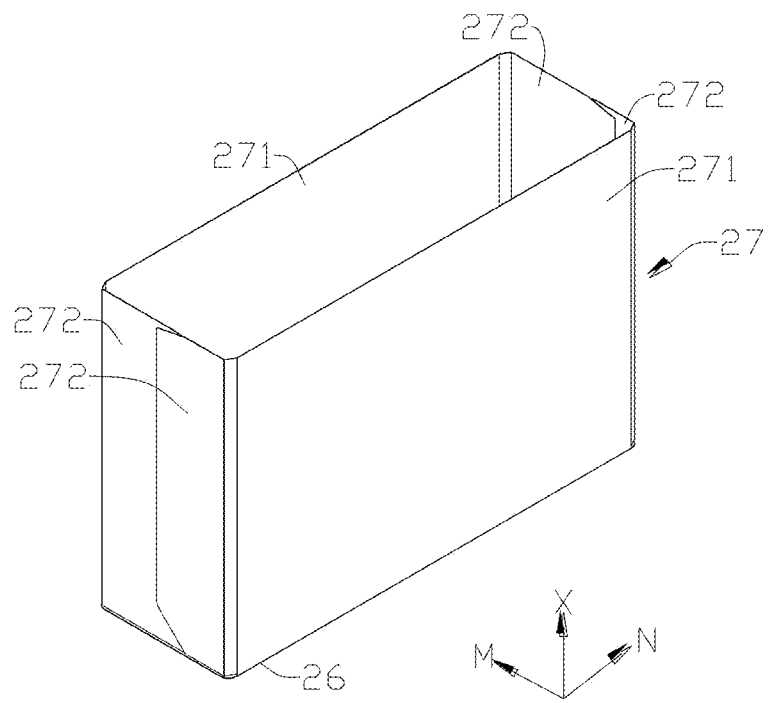
FIG. 12 is a schematic structural diagram after first separation portions and second separation portions of the first insulating member are folded according to some embodiments of the present application.

With reference to FIG. 11 and FIG. 12, in some embodiments, the side walls 213 include two first side walls 2131 opposite in a fourth direction M and two second side walls 2132 opposite in a fifth direction N; the second insulating member 27 includes two first separation portions 271 and second separation portions 272, the two first separation portions 271 are connected to two ends of the first insulating member 26 in the fourth direction M, two ends of each first separation portion 271 in the fifth direction N are connected with the second separation portions 272, the two first separation portions 271 are used for separating the two first side walls 2131 and the electrode assembly 22, the second separation portions 272 are used for separating the second side walls 2132 and the electrode assembly 22, and the fourth direction M, the fifth direction N, and the thickness direction X of the bottom wall are perpendicular to each other. The first separation portions 271 are connected to the first insulating member 26 in a foldable manner, and the first separation portions 271 are folded around first creases 262 relative to the first insulating member 26, so that the first separation portions 271 and the first insulating member 26 can be in a vertical state. The second separation portions 272 are connected to the first separation portions 271 in a foldable manner, and the second separation portions 272 are folded around second creases 273 relative to the first separation portions 271, so that the first separation portions 271 and the second separation portions 272 can be in a vertical state. The second separation portions 272 at the same end of the two first separation portions 271 in the fifth direction N can or cannot overlap after folded relative to the first separation portions 271, so as to jointly separate the second side walls 2132 and the electrode assembly 22.

The fifth direction N may be the same as or different from the arrangement direction of the two bent portions II of the electrode assembly 22. In an embodiment where the fifth direction N is the same as the arrangement direction of the two bent portions II of the electrode assembly 22, the fourth direction M is the same as the arrangement direction of the plurality of electrode assemblies 22.

In an embodiment where the battery cell 20 includes a plurality of electrode assemblies 22 arranged side by side, the two first separation portions 271 are located at two ends of an overall structure formed by the plurality of electrode assemblies 22 in the arrangement direction.

Figure 13:
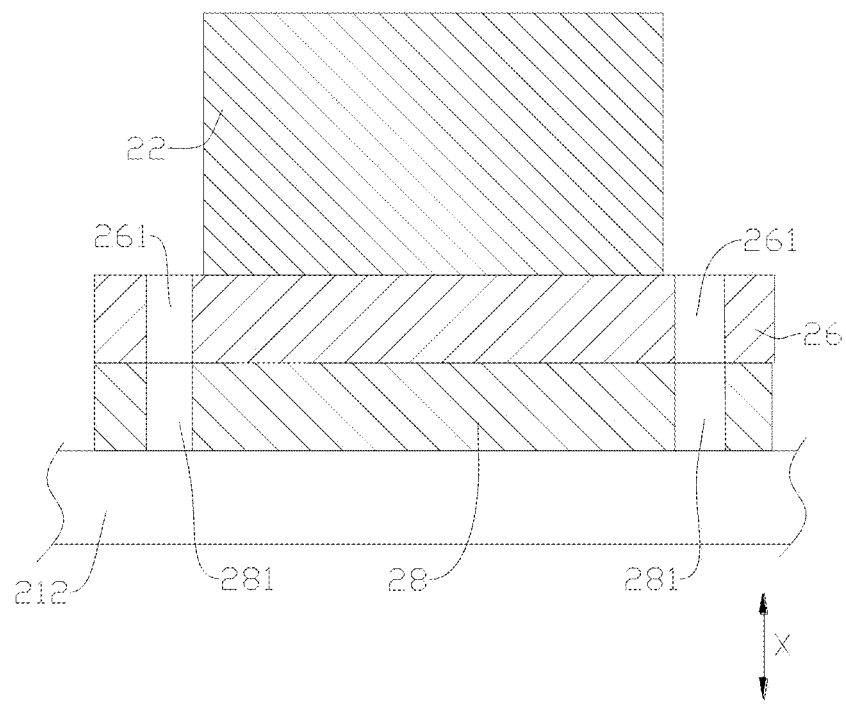
FIG. 13 is a partial cross-sectional view of a battery cell provided by some embodiments of the present application.

As shown in FIG. 13, in some embodiments, the battery cell 20 further includes a support member 28, the support member 28 is disposed between the first insulating member 26 and the bottom wall 212, and the support member 28 is provided with a second through hole 281 corresponding to the first through hole 261.

The support member 28 may be split from the first insulating member 26, or the support member 28 and the first insulating member 26 may be split and then connected into an overall structure. Alternatively, the support member 28 and the first insulating member 26 may be integrally formed.

The support member 28 may be positioned with the assembly apparatus 2200 for assembling the battery cell 20 via the second through hole 281, thereby improving the assembly quality. The support member 28 is provided with the second through hole 281 corresponding to the first through hole 261, which may be understood as the first through hole 261 and the second through hole 281 are disposed coaxially to facilitate accurate positioning between the first insulating member 26 and the support member 28, so as to improve the assembly quality.

The support member 28 is disposed between the first insulating member 26 and the bottom wall 212, which can raise the position of the electrode assembly 22 relative to the bottom wall 212, and reduce the risk of wrinkling of the electrode plates due to interference between the connection positions of the side walls 213 and bottom wall 212 of the shell 21 and the electrode plates, thereby reducing the risk of a short circuit in the battery cell 20.

An embodiment of the present application further provides a battery 100. The battery 100 includes the battery cell 20 provided by any of the foregoing embodiments.

There is no channel extending in the thickness direction X of the bottom wall between the electrode assembly 22 of the battery cell 20 and the bottom wall 212 of the shell 21, thereby eliminating a linear ion channel between the electrode assembly 22 and the bottom wall 212, reducing the risk that ions of the electrode assembly 22 can reach the shell 21 via the first through hole 261, reducing the risk that the ions of the electrode assembly 22 reach the shell 21 to cause a short circuit in the battery cell 20, and improving the safety performance of the battery 100 accordingly.

An embodiment of the present application further provides an electrical device, which includes the battery cell 20 provided by any of the foregoing embodiments.

The battery cell 20 provides electrical energy for the electrical device. There is no channel extending in the thickness direction X of the bottom wall between the electrode assembly 22 of the battery cell 20 and the bottom wall 212 of the shell 21, thereby eliminating a linear ion channel between the electrode assembly 22 and the bottom wall 212, reducing the risk that ions of the electrode assembly 22 can reach the shell 21 via the first through hole 261, reducing the risk that the ions of the electrode assembly 22 reach the shell 21 to cause a short circuit in the battery cell 20, and improving the power safety of the electrical device accordingly.

Figure 14:
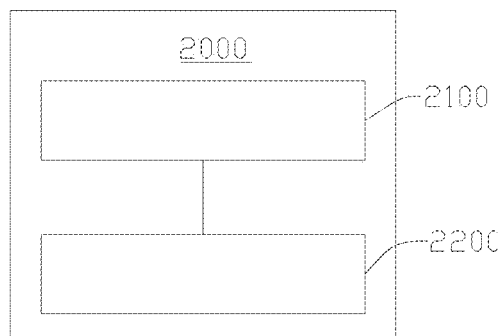
FIG. 14 is a schematic structural diagram of a manufacturing device for a battery cell provided by some embodiments of the present application.

As shown in FIG. 14, an embodiment of the present application further provides a manufacturing device 2000 for a battery cell. The manufacturing device 2000 for a battery cell includes a provision apparatus 2100 and an assembly apparatus 2200; the provision apparatus 2100 is configured to provide a shell 21, an electrode assembly 22, and a first insulating member 26, where the shell 21 has an opening 211 and a bottom wall 212 opposite to the opening 211; the assembly apparatus 2200 is configured to accommodate the first insulating member 26 and the electrode assembly 22 in the shell 21, so that the first insulating member 26 separates the electrode assembly 22 and the bottom wall 212; and the first insulating member 26 is provided with a first through hole 261, and projections of the electrode assembly 22 and the first through hole 261 on the bottom wall 212 do not overlap in a thickness direction X of the bottom wall.

As shown in FIG. 15, an embodiment of the present application further provides a manufacturing method for a battery cell 20. The manufacturing method for the battery cell 20 includes:

S100: Provide a shell 21, an electrode assembly 22, and a first insulating member 26, where the shell 21 has an opening 211 and a bottom wall 212 opposite to the opening 211; and S200: Accommodate the first insulating member 26 and the electrode assembly 22 in the shell 21, so that the first insulating member 26 separates the electrode assembly 22 and the bottom wall 212.

The first insulating member 26 is provided with a first through hole 261, and projections of the electrode assembly 22 and the first through hole 261 on the bottom wall 212 do not overlap in a thickness direction X of the bottom wall.

An embodiment of the present application provides a battery cell 20. The battery cell 20 includes a shell 21, an electrode assembly 22, a first insulating member 26, and a second insulating member 27. The shell 21 includes a bottom wall 212 and side walls 213, and the side walls 213 are disposed on a periphery of the bottom wall 212 and connected to the bottom wall 212; the electrode assembly 22 is accommodated in the shell 21; and the first insulating member 26 is used for separating the electrode assembly 22 and the bottom wall 212, and the second insulating member 27 is used for separating the electrode assembly 22 and the side walls 213. The first insulating member 26 and the second insulating member 27 are integrally formed. The first insulating member 26 is provided with a first through hole 261, and projections of the electrode assembly 22 and the first through hole 261 on the bottom wall 212 do not overlap in a thickness direction of the bottom wall 212. A linear ion channel between the electrode assembly 22 and the bottom wall 212 is eliminated, the risk that ions of the electrode assembly 22 can reach the shell 21 via the first through hole 261 is reduced, and the risk that the ions of the electrode assembly 22 reach the shell 21 to cause a short circuit in the battery cell 20 is also reduced. Moreover, as the risk that the ions of the electrode assembly 22 reach the shell 21 is reduced, the risk of corrosion of the shell 21 after the ions are in contact with the shell 21 can also be reduced.

Described above are merely some embodiments of the present application, and the present application is not limited thereto. Various modifications and variations may be made to the present application for those skilled in the art. Any modifications, equivalent substitutions, improvements, and the like made within the spirit and principle of the present application shall fall within the protection scope of the present application.

What is claimed is:

1. A battery cell, comprising:
   a shell having an opening and a bottom wall opposite to the opening;
   an electrode assembly accommodated in the shell;
   a first insulating member used for separating the electrode assembly and the bottom wall; and
   a support member, wherein the support member is disposed between the first insulating member and the bottom wall;
   wherein:
      the first insulating member is provided with a first through hole, and projections of the electrode assembly and the first through hole on the bottom wall do not overlap in a thickness direction of the bottom wall; and
      the support member is provided with a second through hole corresponding to the first through hole, and the first through hole and the second through hole are disposed coaxially.

2. The battery cell according to claim 1, wherein the electrode assembly has a first end face facing the bottom wall, and the first end face exposes electrode plates of the electrode assembly.

3. The battery cell according to claim 2, wherein:
   the electrode assembly comprises a first electrode plate and a second electrode plate with opposite polarities, and the first electrode plate and the second electrode plate are wound around a winding axis perpendicular to the bottom wall;
   the electrode assembly comprises a separator, a plurality of first electrode plates, and a plurality of second electrode plates, wherein the first electrode plates and the second electrode plates have opposite polarities, the plurality of first electrode plates and the plurality of second electrode plates are alternately laminated in a first direction, the separator is continuously bent and comprises a plurality of first laminated segments and a plurality of first bent segments, each of the first bent segments is used for connecting two adjacent first laminated segments, the plurality of first bent segments are distributed at two ends of the electrode assembly in a second direction, and the first direction, the second direction, and the thickness direction of the bottom wall are perpendicular to each other; or
   the electrode assembly comprises a plurality of first electrode plates and a second electrode plate, the first electrode plates and the second electrode plate have opposite polarities, the second electrode plate is continuously bent and comprises a plurality of second laminated segments and a plurality of second bent segments, the plurality of second laminated segments and the plurality of first electrode plates are alternately laminated in the first direction, each of the second bent segments is used for connecting two adjacent second laminated segments, the plurality of second bent segments are distributed at two ends of the electrode assembly in the second direction, and the first direction, the second direction, and the thickness direction of the bottom wall are perpendicular to each other.

4. The battery cell according to claim 2, wherein:
   the shell has side walls, and the side walls are disposed on a periphery of the bottom wall; and
   the electrode assembly is a wound electrode assembly and comprises a straight portion and two bent portions, the two bent portions are connected to two ends of the straight portion separately, and the first through hole is disposed between the bent portions and the side walls.

5. The battery cell according to claim 2,
   wherein the shell further includes side walls, and the side walls are disposed on a periphery of the bottom wall;
   the battery cell further comprising:
      a second insulating member, wherein the second insulating member is used for separating the electrode assembly and the side walls.

6. The battery cell according to claim 1, wherein:
   the electrode assembly comprises a first electrode plate and a second electrode plate with opposite polarities, and the first electrode plate and the second electrode plate are wound around a winding axis perpendicular to the bottom wall; or
   the electrode assembly comprises a separator, a plurality of first electrode plates, and a plurality of second electrode plates, wherein the first electrode plates and the second electrode plates have opposite polarities, the plurality of first electrode plates and the plurality of second electrode plates are alternately laminated in a first direction, the separator is continuously bent and comprises a plurality of first laminated segments and a plurality of first bent segments, each of the first bent segments is used for connecting two adjacent first laminated segments, the plurality of first bent segments are distributed at two ends of the electrode assembly in a second direction, and the first direction, the second direction, and the thickness direction of the bottom wall are perpendicular to each other; or
   the electrode assembly comprises a plurality of first electrode plates and a second electrode plate, the first electrode plates and the second electrode plate have opposite polarities, the second electrode plate is continuously bent and comprises a plurality of second laminated segments and a plurality of second bent segments, the plurality of second laminated segments and the plurality of first electrode plates are alternately laminated in the first direction, each of the second bent segments is used for connecting two adjacent second laminated segments, the plurality of second bent segments are distributed at two ends of the electrode assembly in the second direction, and the first direction, the second direction, and the thickness direction of the bottom wall are perpendicular to each other.

7. The battery cell according to claim 6,
   wherein the shell further includes side walls, and the side walls are disposed on a periphery of the bottom wall;
   the battery cell further comprising:

a second insulating member, wherein the second insulating member is used for separating the electrode assembly and the side walls.

8. The battery cell according to claim 1, wherein:
the shell has side walls, and the side walls are disposed on a periphery of the bottom wall; and
the electrode assembly is a wound electrode assembly and comprises a straight portion and two bent portions, the two bent portions are connected to two ends of the straight portion separately, and the first through hole is disposed between the bent portions and the side walls.

9. The battery cell according to claim 8, wherein the first insulating member is rectangular, and the first through hole is disposed in at least one of four corners of the first insulating member.

10. The battery cell according to claim 9, wherein:
the battery cell comprises a plurality of electrode assemblies arranged side by side; and
in an arrangement direction of the plurality of electrode assemblies, the first through hole is disposed between two adjacent bent portions.

11. The battery cell according to claim 9, wherein two groups of first through holes are disposed between two adjacent electrode assemblies, the two groups of first through holes are spaced, and some straight portions are located between the two groups of first through holes.

12. The battery cell according to claim 8, wherein:
the battery cell comprises a plurality of electrode assemblies arranged side by side; and
in an arrangement direction of the plurality of electrode assemblies, the first through hole is disposed between two adjacent bent portions.

13. The battery cell according to claim 12, wherein two groups of first through holes are disposed between two adjacent electrode assemblies, the two groups of first through holes are spaced, and some straight portions are located between the two groups of first through holes.

14. The battery cell according to claim 8, wherein two groups of first through holes are disposed between two adjacent electrode assemblies, the two groups of first through holes are spaced, and some straight portions are located between the two groups of first through holes.

15. The battery cell according to claim 1,
wherein the shell further includes side walls, and the side walls are disposed on a periphery of the bottom wall;
the battery cell further comprising:
a second insulating member, wherein the second insulating member is used for separating the electrode assembly and the side walls.

16. The battery cell according to claim 15, wherein the second insulating member is integrally formed with the first insulating member.

17. A battery, comprising the battery cell according to claim 1.

18. An electrical device, comprising the battery cell according to claim 1.

* * * * *